(12) United States Patent
Mariniello et al.

(10) Patent No.: US 9,137,693 B2
(45) Date of Patent: Sep. 15, 2015

(54) SYSTEM FOR CONTROLLING A TELECOMMUNICATION NETWORK NODE, METHOD AND COMPUTER PROGRAM THEREFOR

(75) Inventors: Francesco Mariniello, Salerno (IT); Paolo Elefante, Napoli (IT); Dario Scudiero, Napoli (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 180 days.

(21) Appl. No.: 13/993,777

(22) PCT Filed: Dec. 15, 2010

(86) PCT No.: PCT/EP2010/069732
§ 371 (c)(1),
(2), (4) Date: Jun. 13, 2013

(87) PCT Pub. No.: WO2012/079626
PCT Pub. Date: Jun. 21, 2012

(65) Prior Publication Data
US 2013/0258993 A1   Oct. 3, 2013

(51) Int. Cl.
*G06F 15/16* (2006.01)
*H04W 24/08* (2009.01)
(Continued)

(52) U.S. Cl.
CPC ........... *H04W 24/08* (2013.01); *H04L 43/0817* (2013.01); *H04L 41/06* (2013.01)

(58) Field of Classification Search
CPC ................... H04L 12/2602; H04L 2012/4026; H04L 29/06027; H04L 41/06; H04L 47/22
USPC ................................... 370/230, 352; 455/423
See application file for complete search history.

(56) References Cited

U.S. PATENT DOCUMENTS

2003/0037341 A1   2/2003   Van Der Meulen
2005/0043023 A1 *  2/2005   Romeo .......................... 455/423
(Continued)

OTHER PUBLICATIONS

International Search Report, Application No. PCT/EP2010/069732, Jun. 27, 2011.
(Continued)

*Primary Examiner* — Dang Ton
*Assistant Examiner* — Sai Aung
(74) *Attorney, Agent, or Firm* — Myers Bigel Sibley & Sajovec, P.A.

(57) ABSTRACT

A system (10) includes a telecommunication network node (12), a first unit (14) configured for sending information (15*i*) relating to the status of the node (12), and a second unit (16) configured for receiving information (16*i*) for controlling the node (12). A management unit (18) of the node (12) is connected with the second unit (16) and is configured for controlling the node (12) according to the information (16*i*) received by the second unit (16). The form of the information (14*i*) sent by the first unit (14) and/or the information (16*i*) received by the second unit (16) either does not include, or includes more than, only text. The invention also relates to use of such a system (10), and methods and computer programs implementing the invention. In one embodiment, the first unit includes a camera configured for taking pictures of at least an outer surface of the telecommunication network node. This enables sending information of the telecommunication network node to be controlled, monitored and/or managed, so as to enable the detection, for instance, of any light-emitting diodes (LEDs) which would therefore provide evidence of an abnormal condition within telecommunication network node.

12 Claims, 8 Drawing Sheets

(51) Int. Cl.
*H04L 12/26* (2006.01)
*H04L 12/24* (2006.01)

(56) References Cited

U.S. PATENT DOCUMENTS

2006/0089985 A1    4/2006  Poletto
2006/0168083 A1*   7/2006  Lee et al. ................. 709/207
2009/0234919 A1*   9/2009  Jefremov et al. ............ 709/204
2009/0274279 A1*  11/2009  Reynolds ................... 379/88.16
2010/0208586 A1*   8/2010  Papenfort et al. ............ 370/230

OTHER PUBLICATIONS

Written Opinion of the International Searching Authority, Application No. PCT/EP2010/069732, Jun. 27, 2011.
International Preliminary Report on Patentability, Application No. PCT/EP2010/069732, Dec. 14, 2012.

* cited by examiner

SYSTEM FOR CONTROLLING A TELECOMMUNICATION NETWORK NODE, METHOD AND COMPUTER PROGRAM THEREFOR

CROSS REFERENCE TO RELATED APPLICATION

This application is a 35 U.S.C. §371 national stage application of PCT International Application No. PCT/EP2010/069732, filed on 15 Dec. 2010, the disclosure and content of which is incorporated by reference herein in its entirety. The above-referenced PCT International Application was published in the English language as International Publication No. WO 2012/079626 A1 on 21 Jun. 2012.

TECHNICAL FIELD

The present invention relates to systems for controlling telecommunication network nodes, uses of such systems, methods for controlling telecommunication network nodes, and computer programs therefor. The invention may for instance be used for node fault detection and management, node configuration management, node performance management, security management, without being limited to these applications.

BACKGROUND

In the context of telecommunication networks, there is a need for easing and improving the control, monitoring and management of telecommunication network nodes, such as nodes belonging to an access network, a core network, an intelligent network (providing additional functionalities beyond the usual functionalities provided to subscribers), a transmission network, or to any other network. In particular, the control, monitoring or management of such nodes may be cumbersome and may require network managers to learn and master a number of instructions to be used in a command console to remotely interact with the network node(s) to be managed.

It is desirable to provide systems, methods and computer programs to improve the control, monitoring and management of telecommunication network nodes.

SUMMARY

To meet or at least partially meet the above-mentioned goals, such systems, methods, and computer programs are defined in the independent claims. Advantageous embodiments are defined in the dependent claims.

In one embodiment, a system includes a telecommunication network node, a first unit, and a second unit. The telecommunication network node is the node to be controlled, monitored and/or managed. The first unit is configured for sending, for instance to a remote management network node operated by a network manager, information relating to the status of the telecommunication network node. The second unit is configured for receiving, for instance from a remote management network node operated by a network manager, information for controlling the telecommunication network node. The telecommunication network node includes a management unit connected with the second unit and configured for controlling the telecommunication network node according to the information received by the second unit. The form of at least one of the information sent by the first unit and the information received by the second unit either does not include, or includes more than, only text.

The method provides an infrastructure for controlling, monitoring and/or managing a telecommunication network node using advanced forms of interaction between an external management system, such as for instance a remote management network node, and the telecommunication network node to be controlled, monitored and/or managed. Rather than using text instructions to remotely control, monitor and/or manage a telecommunication network node, or in addition to using text instructions to remotely control, monitor and/or manage such a node, a user, such as a network manager, may use advanced means of interactions with the telecommunication network node, in contrast to the prior art ways of managing telecommunication network nodes.

In one embodiment, the form of at least one of the information sent by the first unit and the information received by the second unit includes at least one of audio data, still image data, and video data.

In this embodiment, exchanging information in the form of audio data, still image data, and/or video data with the telecommunication network node enables an improved form of control, monitoring and/or management of the telecommunication network node. For example, a network manager may be able to send voice instructions to the second unit that may be provided with computer-readable instructions to recognize the voice instructions transmitted from the network manager, so that the management unit can control the telecommunication network node accordingly. As another example, the first unit may be able to regularly send pictures of a portion of the outer surface of the telecommunication network node and the pictures may then be used remotely by a network manager to recognize any particular failure condition that the node would present. Similar forms of interactions may be carried out using exchanges of video data.

In one embodiment, the second unit is included in the telecommunication network node. This provides an integrated component within the telecommunication network node to receive the control information from an external node, such as for instance a remote management network node.

In one embodiment, the first unit and the second unit include a common unit, here referred to as front end unit. The front end unit is configured, for the benefit of the first unit, to send, for instance to a remote management network node operated by a network manager, information relating to the status of the telecommunication network node. The front end unit is also configured, for the benefit of the second unit, for receiving, for instance from a remote management network node operated by a network manager, information for controlling the telecommunication network node. The front end unit is further configured, for both the first and second units, for maintaining session information for supporting the interaction between the front end unit and an external management node.

This embodiment enables to support advanced interactions, such as multimedia-based interactions, involving storing, by the front end unit or by another unit to the benefit of the front end unit, stateful or semi-persistent information regarding the stage of the dialogue or interaction between the management network node at the network manager side and the front end unit at the telecommunication network node side.

In one embodiment, the first unit includes at least one of the following means: means for converting the information relating to the status of the telecommunication network node into audio data prior to sending this information (for instance to a remote management network node operated by a network manager), means for converting the information relating to the status of the telecommunication network node into still image data prior to sending this information (for instance to a remote management network node operated by a network manager), and means for converting the information relating to the status of the telecommunication network node into video data prior to sending this information (for instance to a remote management network node operated by a network manager).

In one embodiment, the second unit includes at least one of the following means: means for converting the received information from an audio data form into commands understandable by the management unit, means for converting the received information from a still image data form into commands understandable by the management unit, and means for converting the received information from a video data form into commands understandable by the management unit.

In one embodiment, the system is such that the telecommunication network node is implemented as one or more blades of a blade system and the first unit is implemented as one blade of the blade system.

A blade system is here understood as a computer system having a blade cluster structure. A blade cluster structure is made of an enclosure (or chassis) including a plurality of servers or blades (also called cards or boards) in a dense configuration (for instance 16, 32, 64 or 128 blades in one enclosure). A blade is typically made up of a processor (processing unit), a volatile memory, networking capabilities and a non-volatile storage (e.g. flash memory or small hard disk). The blade cluster structure's enclosure provides the bulky elements and services such as power supply and cooling. Although a blade comprises more than just a processing unit, a blade may also here be referred to as a processing unit, for the sake of simplicity. The terms are used interchangeably, although in reality a blade comprises more elements than just a processing unit.

A blade cluster structure provides flexibility (a blade is usually designed to be easily removed, possibly in runtime, from the blade cluster structure or added to the blade cluster structure without interfering with the other blades), space saving (the blade cluster structure's enclosure provides the bulky hardware elements) and improves manageability (a blade can operate independently).

In one embodiment, the first unit includes a camera configured for taking pictures of at least an outer surface of the telecommunication network node. This enables sending, from the first unit to an external management node, information showing an outer surface of the telecommunication network node to be controlled, monitored and/or managed, so as to enable the detection, for instance, of any light-emitting diodes (LEDs) which would be blinking and which would therefore provide evidence of an abnormal condition within the telecommunication network node to be controlled, monitored and/or managed. In one embodiment, the pictures sent from the first unit may be processed on the first unit side or elsewhere (for instance remotely by the external management unit) to add to the pictures augmented information regarding, for instance, the usual meaning of the blinking LED(s). For instance, a network manager could be offered the possibility to click on a hyperlink added to the picture next to the blinking LED in order to obtain or download specific information relating to the meaning of the LED.

The invention also relates to the use of a system as described above for fault detection at the telecommunication network node and management of the telecommunication network node. The invention further relates to the use of a system as described above, for configuration of the telecommunication network node. The invention yet further relates to the use of a system as described above, for performance management of the telecommunication network node. The invention further relates to the use of a system as described above, for security management of the telecommunication network node.

The invention also relates to a method for controlling a telecommunication network node including a procedure for sending, by a first unit (for instance to a remote management network node operated by a network manager), information relating to the status of the telecommunication network node, and a procedure for receiving, by a second unit (for instance from a remote management network node operated by a network manager), information for controlling the telecommunication network node. The telecommunication network node is controlled by a management unit of the telecommunication network node, wherein the management unit is connected to the second unit and the control of the telecommunication network node is carried out in accordance with the information received by the second unit. The form of at least the information sent during the sending procedure and the information received during the receiving procedure either does not include, or includes more than, only text.

The invention also relates to computer programs including computer-readable instructions configured, when executed on a computer, to carry out the method as described above or a portion of the method as described above.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
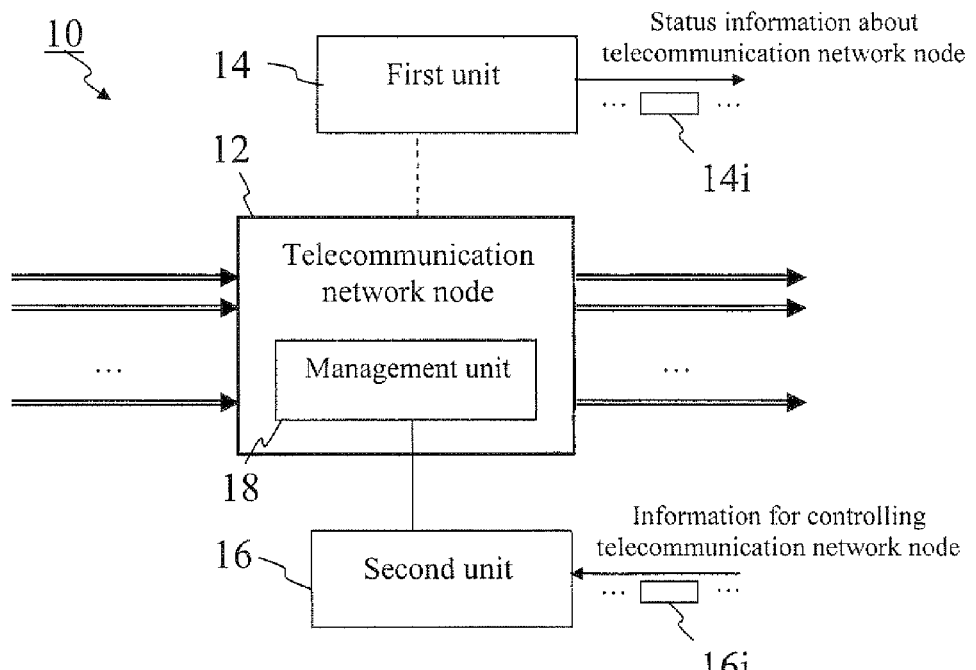
FIG. 1 schematically illustrates a system in one embodiment of the invention.

FIG. 1 schematically illustrates a system 10 in one embodiment of the invention. The system 10 includes a telecommunication network node 12, a first unit 14 and a second unit 16. The telecommunication network node 12 itself includes a management unit 18.

The telecommunication network node 12 is configured for performing tasks associated with a node in a telecommunication network, such as, but not limited to, an access network, a core network, an intelligent network, or a transmission network. The telecommunication network node 12 may for instance be configured for sending, receiving or forwarding information, performing packet switching, scheduling, routing, redistribution or inspection, policy enforcement, etc. The telecommunication network node 12 may for instance be, but is not limited to, a base transceiver station (BTS), a base station controller (BSC), a home location register (HLR), a visitor location register (VLR), a mobile switching center (MSC), a gateway GPRS support node (GGSN), a serving GPRS support node (SGSN), a radio network controller (RNC), or a media gateway (MGW).

The incoming arrows on the left-hand side of the telecommunication network node 12 schematically represent incoming data, and the outgoing arrows on the right-hand side of the telecommunication network node 12 schematically represent outgoing data, wherein the data may be subject to any type of processing within the telecommunication network node 12.

The management unit 18 may be configured for modifying, adding, setting, deleting, adapting, tuning, updating, etc, some parameters of the telecommunication network node 12. The management unit 18 may for instance be capable to reset the telecommunication network node 12 or to cause the telecommunication network node 12 to start a reset, to change some buffering, queue or quality of service (QoS) parameters of the telecommunication network node 12, to install software updates on the telecommunication network node 12, etc.

The first unit 14 is configured for acquiring information regarding the status of the telecommunication network node 12. The dotted line depicted between the first unit 14 and the telecommunication network node 12 schematically represents the capability of the first unit 14 to acquire the status information from the telecommunication network node 12. Acquiring the status information by the first unit 14 may take place either directly, for instance by receiving at regular intervals a log file including information related to the status and operation of the telecommunication network node 12, or indirectly. For instance, the first unit 14 may include a camera recording pictures of an outer surface of the telecommunication network node 12, wherein indicators, such as LEDs, representing the internal technical state of the telecommunication network node 12 may be arranged to be visible on the outer surface of the telecommunication network node 12.

The first unit 14 may optionally be configured to process the acquired information about the telecommunication network node 12 so as to send, for instance, to one or more external management nodes (not illustrated in FIG. 1) status information 14i about the telecommunication network node 12. In FIG. 1, the status information 14i is schematically represented as a packet, but the invention is not limited to the transmission of status information 14i in the form of packets. A circuit-based transmission of the status information 14i, rather than a packet-based transmission, may also be used for instance. The information 14i may be sent to an external management node, for instance through an Internet Protocol (IP) backbone (not illustrated on FIG. 1).

The second unit 16 is configured for receiving information 16i for controlling the telecommunication network node 12. Although the information 16i is represented in FIG. 1 as a packet, the communication may for instance be circuit-based and is not limited to packet-based communication. The information 16i may be received by the second unit 16 from an external management node, for instance through an IP backbone (not illustrated on FIG. 1). The information 16i for controlling the telecommunication network node 12 may be created and constructed as a result of analyzing (not illustrated in FIG. 1) the status information 14i sent by the first unit 14. In one embodiment, an external management node (not illustrated in FIG. 1), which may be controlled by a network manager or operator, may receive the status information 14i and may, as a result of receiving and analyzing the status information 14i (for example, by recognizing an abnormal condition), create and send instructions in the form of the information 16i for controlling the telecommunication network node 12. In response to receiving the information 16i for controlling the telecommunication network node 12, the second unit 16 is configured for transmitting control information to the management unit 18 for controlling the telecommunication network node 12. The second unit 16 may optionally process the received control information 16i so as to be able to send instructions to the management unit 18.

In the embodiment illustrated in FIG. 1, the first unit 14 and the second unit 16 are separated from the telecommunication network node 12. In other embodiments, the second unit 16 and/or the first unit 14 may be included and/or integrated in the telecommunication network node 12.

In one embodiment, the telecommunication network node 12 is implemented as a plurality of blades of a blade system (or a plurality of processing units) and the first unit 14 and the second unit 16 may each form a separate blade (or processing unit) of the blade system.

The status information 14i sent by the first unit 14, the information 16i received by the second unit 16, or both the status information 14i and the information 16i is or are in a form that does not include text or that includes more than text. This means that the information at stake is not purely in the form of text commands (such as those required to be exchanged for remote management using a command-line interface) but include more than text commands so as to enable an advanced form of interaction involving the exchange of audio data, still image data, video data, or formatting data such as email headers and control fields (to enable the exchange of emails as information 14i and/or 16i), etc.

Figure 2:
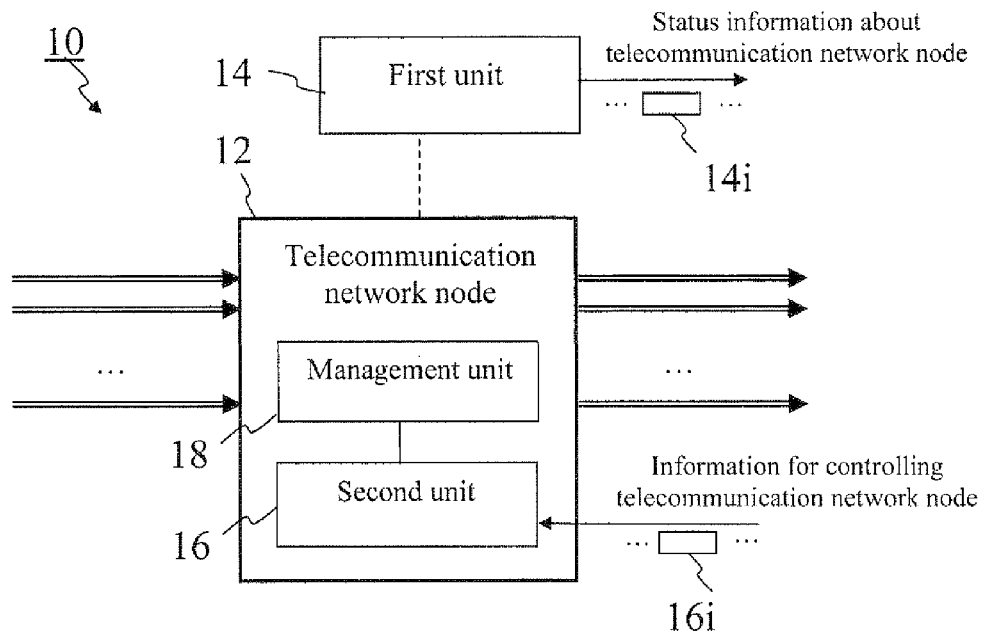
FIG. 2 schematically illustrates a system in one embodiment of the invention, wherein the second unit is included within the telecommunication network node.

FIG. 2 schematically illustrates a system 10 in one embodiment of the invention, differing from the system illustrated in FIG. 1 in that the second unit 16 is included within the telecommunication network node 12. In one embodiment, the second unit 16 and the management unit 18 may form a single unit, for instance in the form of computer-readable instructions stored on the telecommunication network node 12 and configured, when executed, to carry out a computer process or thread on the telecommunication network node 12.

Figure 3:
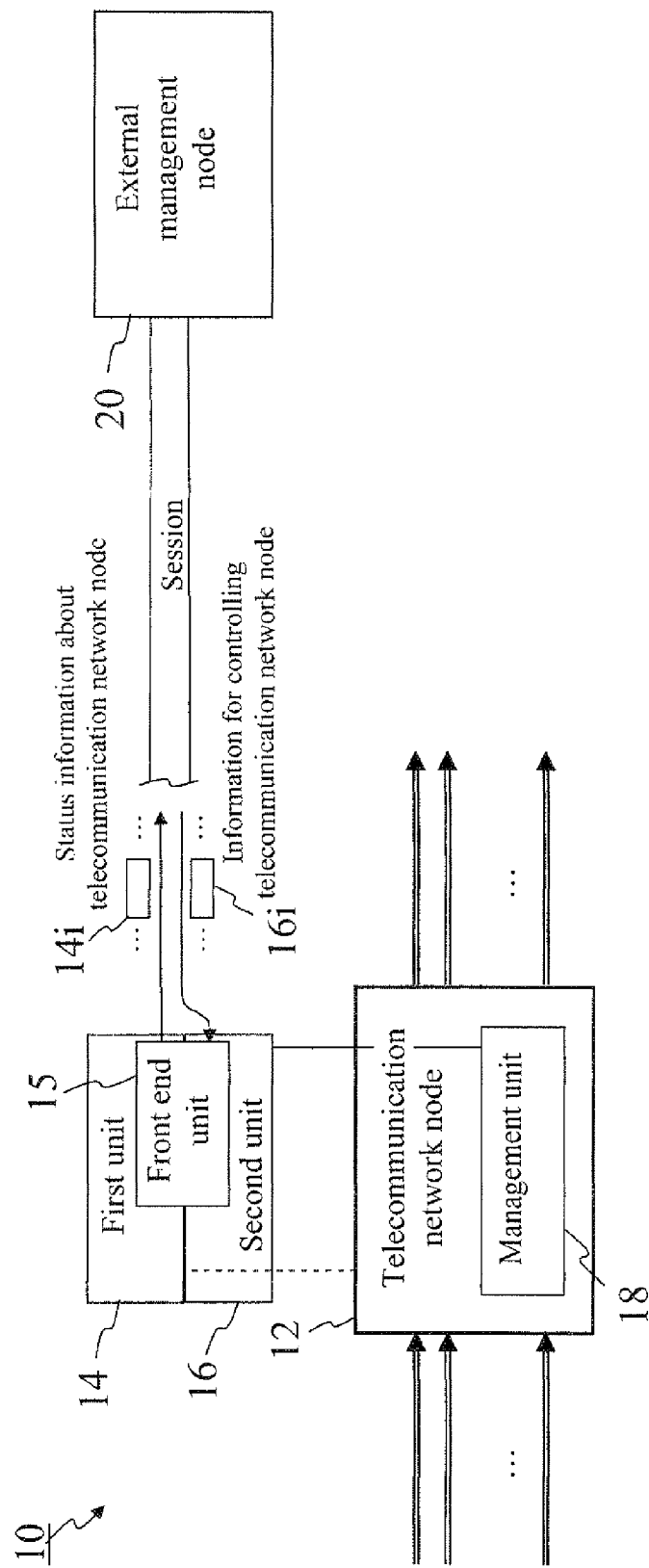
FIG. 3 schematically illustrates a system in one embodiment of the invention, wherein the first unit and the second unit includes a common front end unit configured for communicating with an external management node.

FIG. 3 schematically illustrates a system 10 and an external management node 20 in one embodiment of the invention.

This embodiment of the system 10 according to the invention differs from the embodiment illustrated in FIG. 1 in that the first unit 14 and the second unit 16 include a common front end unit 15. The front end unit 15 is configured for maintaining a session for supporting an interaction with an external management node 20. The external management node 20 may also store information for maintaining such an interaction session. Maintaining a session means storing, and updating or deleting when necessary, semi-persistent or stateful information for supporting a computer-implemented or computer-assisted dialogue of any type (but not including the exchange of text commands only) between the front end unit 15 and the external management node 20. The maintained session and associated parameters enable to realize a sustained interaction during which status information 14i about the telecommunication network node 12 is sent from the first unit 14 through the front end unit 15 and during which information 16i for controlling the telecommunication network node 12 is received by the second unit 16 through the front end unit 15.

Figure 4:
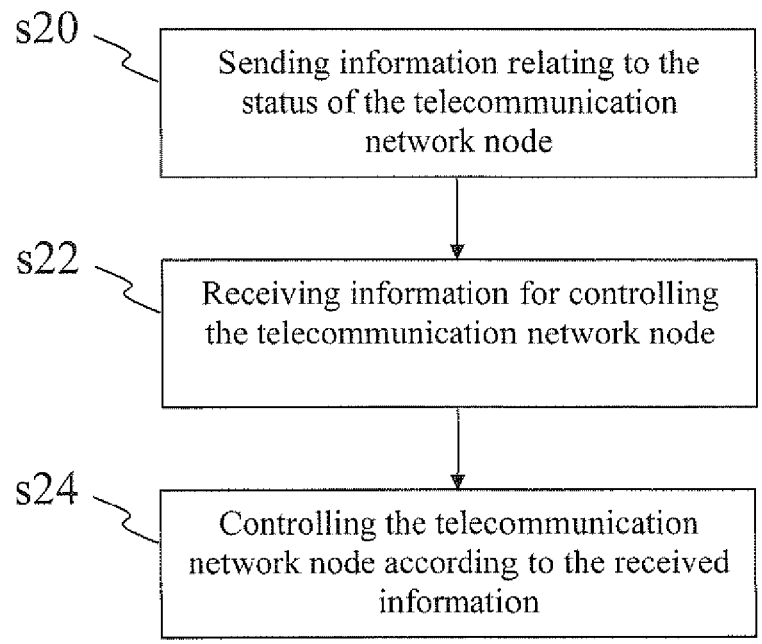
FIG. 4 is a flowchart of a method in one embodiment of the invention.

FIG. 4 is a flowchart of a method in one embodiment of the invention, for controlling a telecommunication network node 12. The method includes a procedure or step s20 of sending, for example to an external management node 20, information 14i relating to the status of the telecommunication network node 12. The method further includes a procedure or step s22 of receiving, for example from an external management node 20, information 16i for controlling the telecommunication network node 12. The arrow depicted in FIG. 4 between steps s20 and s22 schematically represents a possible time sequence pursuant to which step s20 occurs before step s22, but other time sequences are possible. Steps 20 and 22 may also occur in parallel, simultaneously or not, repetitively or not, and step s22 may in particular be carried out before step s20. After step s22, the method includes a procedure or step s24 of controlling the telecommunication network node 12 according the information received in step s22. In this manner, the telecommunication network node 12 is controlled as a result of an interaction with a remote external management node 20 through the management unit 18 of the telecommunication network node 12.

Figure 5:
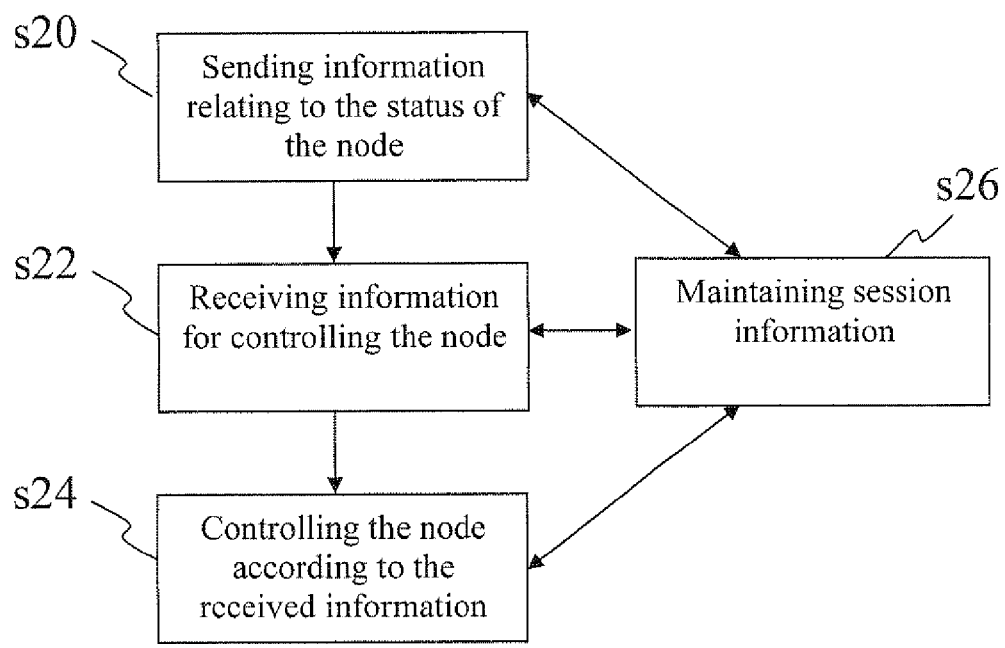
FIG. 5 is a flowchart of a method in one embodiment of the invention, including a procedure or step of maintaining session information for supporting the interaction between a front end unit of the first and second unit and an external management node.

FIG. 5 illustrates a flowchart in the embodiment of the invention, which differs from the embodiment illustrated in FIG. 4 in that a further procedure or step s26 of maintaining session information is carried out to support the interaction between the first and the second units 14, 16 and an external management node 20. The double-headed arrow between step s26 and step s20 schematically represents the feature according to which maintaining session information is carried out to support sending status information 14i toward the external management node 20 as part of a sustained interaction. The double-headed arrow between step s26 and step s22 schematically represents the feature according to which maintaining session information is carried out to support receiving, from the external management node 20, information for controlling the telecommunication network node 12 as part of the sustained interaction. The double-headed arrow between step s26 and step s24 schematically represents the feature according to which maintaining session information globally and eventually supports the control of the telecommunication network node 12.

Figure 6:
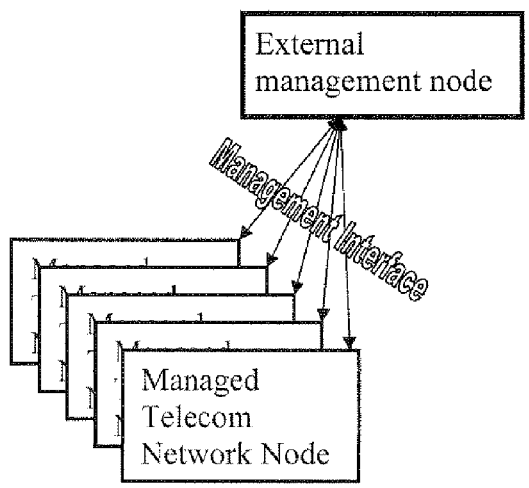
FIG. 6 schematically and conceptually illustrates a prior art system, wherein a management station is configured to manage a plurality of telecommunication network nodes using a conventional management interface.

FIG. 6 schematically and conceptually illustrates the architecture of a prior art system wherein a management interface between an external management node and managed telecommunication network nodes is based on the exchange of instructions in the form of text only. The external management node may for instance include a command-line console enabling an operator to type instructions and to receive replies from the managed telecommunication network nodes in the form of text only.

Figure 7:
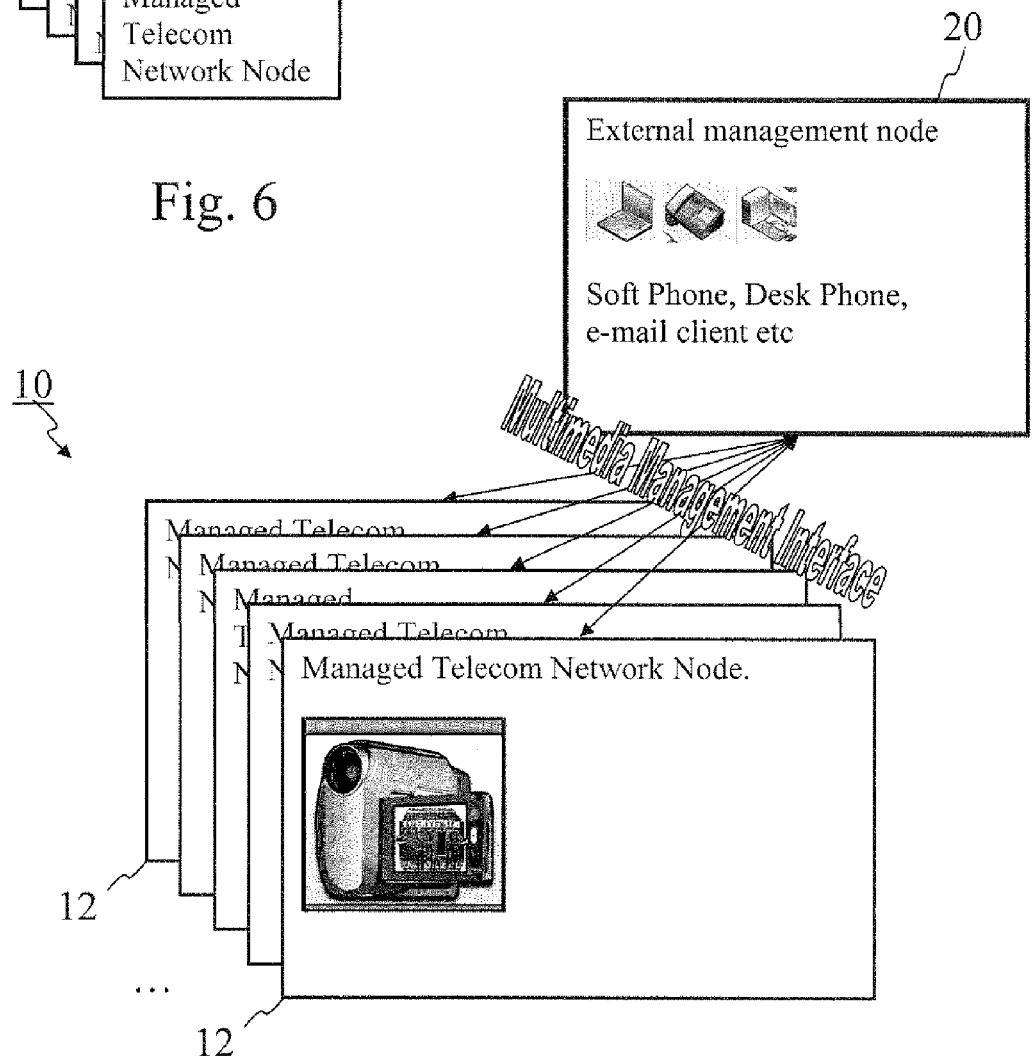
FIG. 7 schematically and conceptually illustrates a system in one embodiment of the invention, wherein a plurality of telecommunication network nodes are managed by a management system over an advanced management interface, such as for instance a multimedia management interface.

FIG. 7 schematically and conceptually illustrates a system 10 in one embodiment of the invention wherein the management interface between the external management node 20 and the managed telecommunication network nodes 12 (or, more precisely, the telecommunication network nodes 12 to be managed) involves sending and/or receiving information in a form that does not include, or includes more than, text. For instance, the external management node 20 may include softphone, i.e. a software-assisted phone, a desk phone, an email client, etc. to communicate with the managed telecommunication network nodes 12. In FIG. 7, a managed telecommunication network node 12 is illustrated with a camera showing an outer surface of the telecommunication network node 12, the camera playing the role of, or forming part of, the above-described first unit 14. The camera enables a live, real-time hardware feed to be reported using the software client applications of the external management node 20, such as for instance the soft phone client, desk phone client, email client, etc. of the external management node 20.

In one embodiment, exchanges of emails may be performed between the managed telecommunication network nodes 12 and the external management node 20, as if the emails from the managed telecommunication network nodes 12 were sent by a human, in order to form a dialogue for easily and conveniently manage the telecommunication network nodes 12.

In one embodiment, the system 10 includes, for controlling the telecommunication network node 12, (a) a front end unit 15 or front end part configured for maintaining an interaction session with an external management node 20, (b) an intermediate unit or intermediate part configured for providing expert functionalities, and (c) a back end unit or back end part including one or more network node specific management applications that relate to the specific functions the telecommunication network node 12, wherein the back end unit or back end part is configured for converting information exchanged by the front end unit 15 into instructions understandable by the management unit 18.

In this embodiment, wherein the system 10 includes these three parts or units, namely (a) the front end unit 15 or part, (b) the intermediate unit or part, and (c) the back end unit or part, each part of the system 10 may be hosted on a dedicated board or blade in the same blade cluster structure as the board or blades of the telecommunication network node 12 to be managed. These three parts may also be hosted on one or more blade or board hosting the telecommunication network node 12 itself, therefore sharing the same blade or board with operational functionalities of the telecommunication network node 12.

Figure 8:
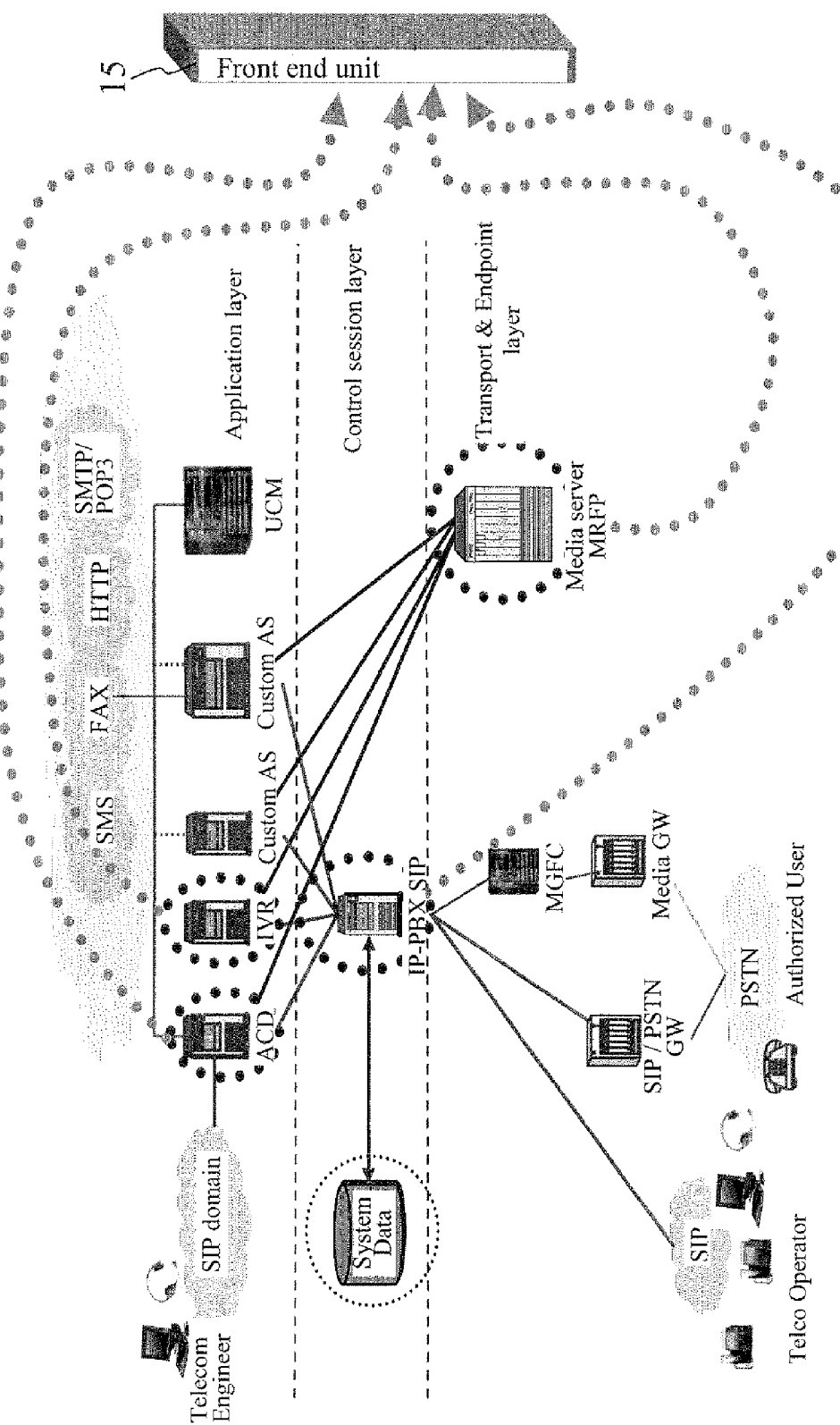
FIG. 8 schematically illustrates computer-implemented functionalities that may be aggregated by a front end unit in a system in one embodiment of the invention.

The front end unit 14 or front end part may aggregate, within a dedicated board or blade in the same blade cluster structure as the blade cluster structure on which the managed telecommunication network node 12 is hosted, the functionalities of different elements proper to a multimedia or advanced network, wherein these elements conventionally exist in different layers of an architecture. Different functions may be aggregated in the front end unit 15, such as for instance an automatic call distributor (ACD) function, an interactive voice response (IVR) function, an interactive voice and video response (IVVR) function, an Internet Protocol (IP) private branch exchange (IP-PBX) function based on the Session Initiation Protocol (SIP) protocol, and a media server media resource function processor (MRFP) function. This aggregation of functions in the front end unit 15 is schematically illustrated in FIG. 8 by the dotted curved lines leading to the front end unit 15 on the right-hand side of the figure. The front end unit 15 may gather a plurality of functions within a single board or blade of a blade cluster structure.

The set of functions of the front end unit 15 is extensible and may be integrated into a SIP-based network. The Proxy/Register SIP may fulfil the requirements of the IP Multimedia Subsystem (IMS) Control Session Layer by forwarding the Voice over IP (VoIP) sessions coming from users towards the proper user or application server. The array of application servers fulfils the requirements of the IMS Application Server Layer making the system open to every kind of application such as e-mail, SMS, http applications.

The front end unit 15 may be provided with additional functions such as for instance a text-to-speech (ITS) function, an automatic-speech-recognition (ASR) function, a text-to-video (TTV) function, etc.

The intermediate unit or part provides expert functionalities. This optional unit or part may be integrated into the telecommunication network node 12, and may be used to enable to interface, if needed, all the hardware and software components of the telecommunication network node 12 via a given standard, such as for instance the simple network management protocol (SNMP), to retrieve the information such as a hardware inventory of the telecommunication network node 12.

The back end layer or unit acts as connector between the intermediate unit or part and the telecommunication network node 12 in order to control, manage or monitor the node 12. The architecture of the back end unit or part may be split into two functional modules. A first module may interact with the intermediate part or unit, while the second module may communicate with the telecommunication network node 12 (or its management unit 18) and may include plug-ins. A plug-in may be developed for each telecommunication network node 12 that needs to be managed. For instance, an MSC plug-in, an HSS plug-in, etc. may be developed.

The advantage of the architecture is that the solution may be integrated with any telecommunication network node 12. A particular plug-in of a back end part or unit may be replaced by another one to perform an update.

Figure 9:
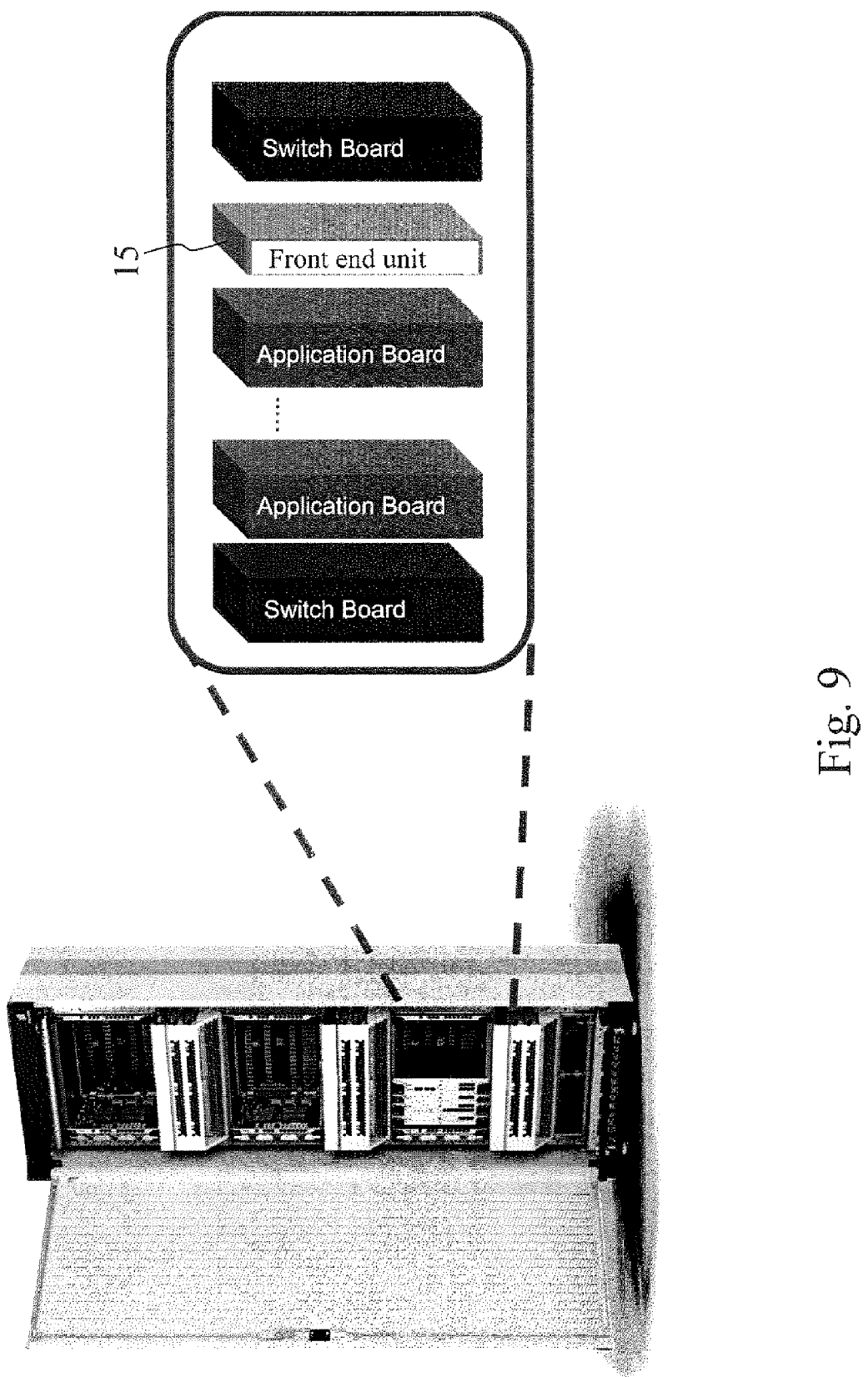
FIG. 9 schematically illustrates a telecommunication network node implemented as a blade system in one embodiment of the invention.

FIG. 9 schematically illustrates the integration of the system 10 within a blade system or blade cluster structure, wherein the blade 15 labelled "front end unit" may also host the intermediate unit and the back end unit, as described above.

Figure 10:
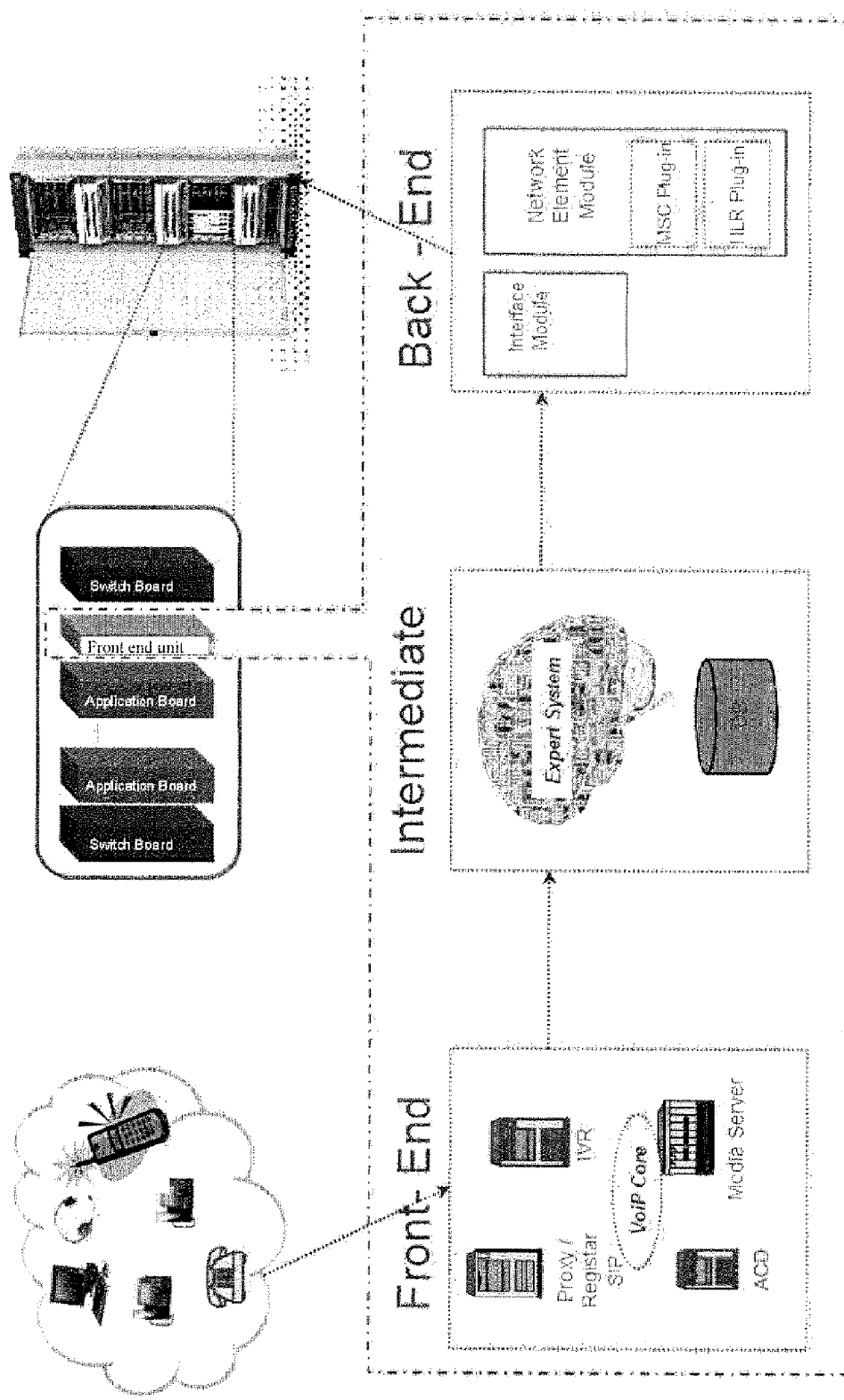
FIG. 10 schematically illustrates the functions of a front end unit common to the first and second units in one embodiment of the invention.

FIG. 10 schematically illustrates the three parts of the front end unit blade 15, including the front end unit itself, the intermediate unit or part, and the back end unit or part. The back end unit or part includes an interface module and a network element module, with, for instance, an exemplary media switching center (MSC) plug-in and an exemplary home location register (HLR) plug-in for communicating with particular telecommunication network nodes 12 (hosted for instance on the boards or blades labelled "application board").

Figure 11:
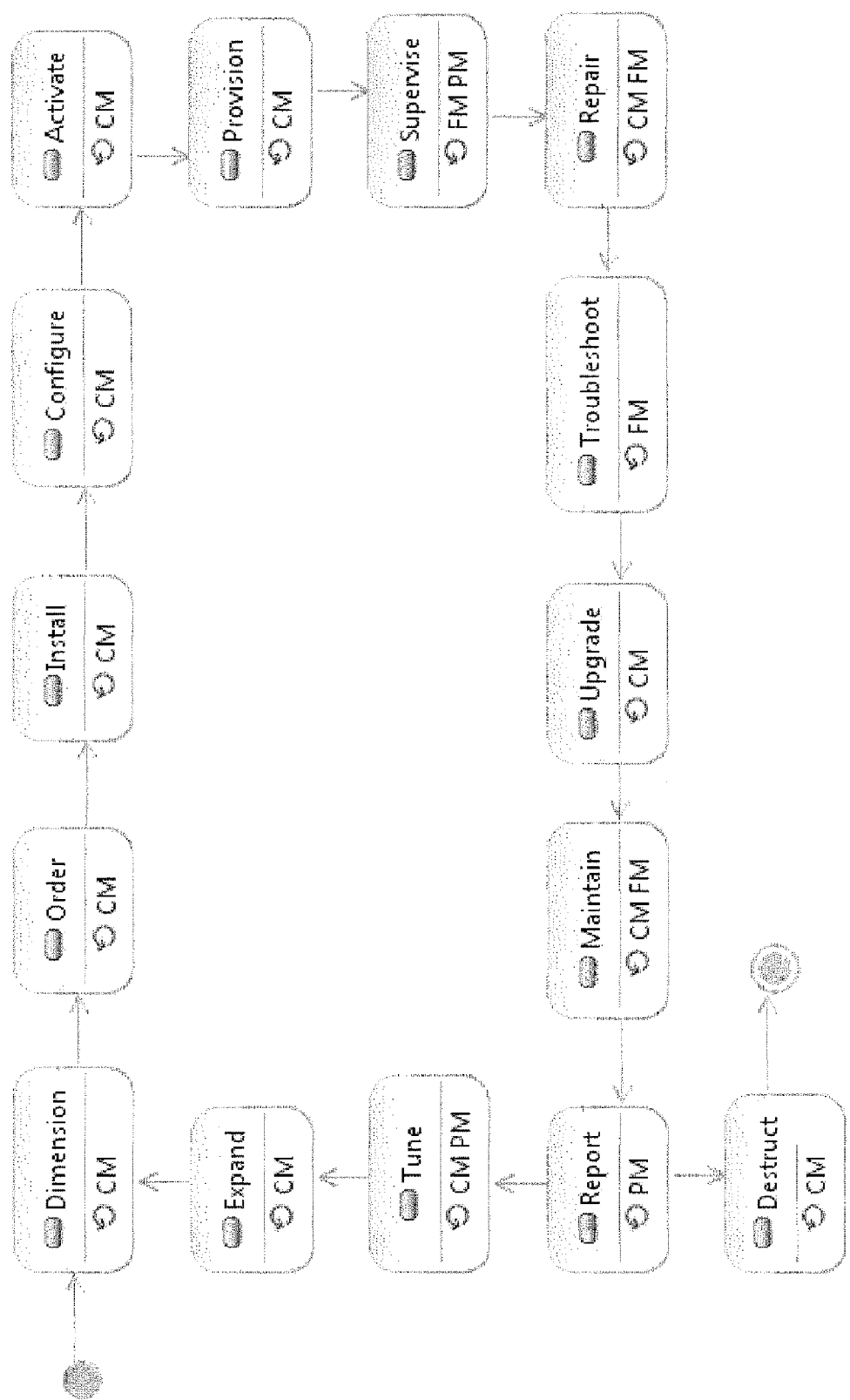
FIG. 11 illustrates a management cycle of a telecommunication network node in the context of which embodiments of the invention may be applied.

FIG. 11 schematically illustrates some types of operations that may be performed with a system 10 in one embodiment of the invention, in order to control, monitor and/or manage a telecommunication network node 12. The operations, which are depicted as forming part of an exemplary life cycle of a node 12, may be classified into configuration management (CM), fault management (FM), and performance management (PM) operations. The different exemplary operations are the dimensioning of the node 12 (so that the node 12 is capable for example of providing a certain coverage, supporting a certain level of telecommunication traffic, workload or activity and ensuring under these conditions a certain quality of service), the ordering of software or hardware components for the node 12, the installing of components on the node 12, the configuration of components for the node 12, the activation the components on the node 12, provisioning it, supervising the operations of the node 12, repairing it, troubleshooting it, upgrading it, maintaining, reporting and then either tuning and expanding the node 12 or destructing the node 12 (end of life of the node).

Now, several embodiments of the system 10 and method for controlling the telecommunication network node 12 will be described.

In the field of node fault detection and management, the following four exemplary uses (a), (b), (c), (d) are herewith described as embodiments of the invention. These uses do not limit the applicability of the invention.

(a) An interactive voice response (IVR) function may be used for fault fixing. Namely, when a failure occurs at the telecommunication network node 12, the first unit 14 may trigger an alarm to be reported to an external management node 20 (the alarm forming part of the status information 14$i$). Then, by means of a VoIP call, a network manager (or operator) may contact the second unit 16 associated with the telecommunication network node 12 and, with voice and video interaction between the network manager and the front end unit 15 associated with the node 12, the fault fixing is attempted, up to the decision to run a predefined script for fault fixing, based on the network manager's input. The telecommunication network node 12 is therefore controlled in accordance with the information 16$i$ received from the network manager side in reaction to a reported failure.

(b) A live, real-time video feed of hardware layout and status of the telecommunication network node 12 may be provided. Namely, a remotely located network manager (or operator) may be able to open a video session with the front end unit 15 in order to remotely command a camera to direct the camera on a certain portion of the outer surface of the telecommunication network node 12 so as to check for example whether a specific LED is switched on a certain board or blade, and so on . . . .

(c) A preventive e-mail may be sent by the first unit 14 upon detecting a suspected malfunction at the telecommunication network node 12. Namely, a health check logic (running computer-readable instructions) existing for the telecommunication network node 12 discovers a suspected malfunction. An e-mail is sent to a network manager (or operator) for an early and preventive analysis of the potential problem. The background health check logic may take into account the number of occurrences of any alarm type during a period of time, the trends of disk or buffer occupation/fill-up, the slow and continuous increase of CPU load or RAM memory over time (which may for instance be an indication of a memory leak within a particular set of computer-readable instructions), the energy consumption of the node 12, etc. All these pieces of information representing the technical state of the telecommunication network node 12 may indicate situations that will lead to failures later on, and this status information 14$i$ may be sent to the network manager.

(d) A preventive reporting of a suspected malfunction at the telecommunication network node 12 may be carried out. As variant of previous use cases via e-mail reporting, a short voice-based summary of the telecommunication network node's 12 health may be a service provided by the IVR on demand from the network manager (or operator). The same background activities as (a), (b), (c) are assumed.

In the field of node configuration management, the following four exemplary uses (e), (f), (g), (h) are herewith described as embodiments of the invention. These uses neither limit the applicability of the invention.

(e) A live, real-time video feed at the occasion of spare part handling or node expansion may be provided. An expert operator from a remote location may be able to open a video session and to remotely command a camera to direct it on a certain part of the outer surface of the telecommunication network node 12. This may for instance help a site engineer to apply the correct cabling in case of hardware spare part handling or node expansion with new hardware.

(f) Retrieval and reporting of software and hardware inventory may be provided. A customer care person from network provider is travelling to a certain site due to a major problem. The person is in the train and via its mobile phone, starts interrogating the telecommunication network node 12 to retrieve, for example, the hardware inventory of that site for the specific hardware components the person is interested in.

(g) The system 10 may also be used for licence management. A structured voice interactive menu may guide the operator in the tree of active licences, offering the possibility to activate other already licensed functions.

(h) Support for software management may also be provided. Live, real-time assistance via voice and video can be provided to an operator to the correct handling of a software update, by suggesting the correct steps and actions according to a predefined set, tied to the specific board, its hardware version and the software currently running.

In the field of performance management, the following exemplary use (i) is herewith described as an embodiment of the invention. This use neither limits the applicability of the invention.

(i) Live, real-time performance data of a node may be provided as the first status information 14i by the first unit 14 of the system 10. A manager of a certain network operator company may want to retrieve real-time statistical data in relation to a particular telecommunication network node 12 on his laptop. The status information 14i may be reported in real-time and may be formatted in a way that the network manager may present the status information to the conference the network manager is about to attend. A live, real-time web-based session may be established with the telecommunication network node 12 in this case.

In the field of security management, the following two exemplary uses (j), (k) are herewith described as embodiments of the invention. These uses neither limit the applicability of the invention.

(j) Live, real-time video control at perimeter violation or fire alarm may be provided. Namely, a video session may support an immediate and real-time inspection of the site wherein the telecommunication network node 12 is located as a response to a reported alarm.

(k) The fraudulent use of copyrighted protocol data may be remotely inspected. A protocol tracer logic may discover a fraudulent use of protocol data from other vendors. The incident is reported via e-mail to the concerned authority with all required information to further check.

The uses of the system 12 and methods are, however, not limited to the above-described uses, and many different uses may be provided for controlling the telecommunication network node 12, the first unit 14 and the second unit 16. Embodiments of the invention may therefore reduce the costs associated with managing a telecommunication network node 12 and the overall costs of the managing a telecommunication network. More convenient and user friendlier approaches may be provided. The access to a node 12 for management thereof may be speeded up.

The physical entities according to the invention, including the telecommunication network node 12, the first and second units 14, 16, and the external management node 20 may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "first unit" and "second unit" are used herewith, no restriction is made regarding how distributed these elements may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a system 10, may be implemented in hardware, software, field-programmable gate array (FPGA), application-specific integrated circuit (ASICs), firmware or the like.

In further embodiments of the invention, any one of the above-mentioned and/or claimed first unit 14, second unit 16, management unit 18, front end unit 15, etc. is replaced by first sending means 14, second receiving means 16, management means 18, front end interaction means 15, etc. respectively, for performing the functions of the first unit 14, second unit 16, management unit 18, front end unit 15, etc.

In further embodiments of the invention, any one of the above-described procedures or steps may be implemented using computer-readable instructions, for example in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A system comprising:
   a telecommunication network node;
   a first hardware unit configured for sending information relating to the status of the telecommunication network node; and
   a second hardware unit configured for receiving information for controlling the telecommunication network node;
   wherein
   the telecommunication network node includes a management hardware unit connected with the second hardware unit and configured for controlling the telecommunication network node according to the information received by the second hardware unit;
   the form of at least one of the information sent by the first hardware unit and the information received by the second hardware unit includes at least one of audio data, still image data, video data, and email;
   the second hardware unit is included in the telecommunication network node; and the telecommunication network node is implemented as one or more blades of a blade system and the first hardware unit is implemented as one blade of the blade system;
wherein the first hardware unit and the second hardware unit include a common hardware unit as a front end hardware unit configured for:
sending information relating to the status of the telecommunication network node;
receiving information for controlling the telecommunication network node; and
maintaining session information for supporting the interaction between the front end hardware unit and an external management node.

2. The system of claim 1, wherein the first hardware unit performs operations comprising at least one of:
converting the information relating to the status of the telecommunication network node into audio data prior to sending it;
converting the information relating to the status of the telecommunication network node into still image data prior to sending it; or
converting the information relating to the status of the telecommunication network node into video data prior to sending it.

3. The system according to claim 1, wherein the second hardware unit performs operations comprising at least one of:
converting the received information from an audio data form into commands understandable by the management hardware unit;
converting the received information from a still image data form into commands understandable by the management hardware unit; or
converting the received information from a video data form into commands understandable by the management hardware unit.

4. The system according to claim 1, wherein the first hardware unit comprises a camera configured for taking pictures of at least an outer surface of the telecommunication network node.

5. A method of controlling a telecommunication network node, including:
sending, by a first hardware unit, information relating to the status of the telecommunication network node;
receiving, by a second hardware unit, information for controlling the telecommunication network node, wherein the sending of the information relating to the status of the telecommunication network node and the receiving of the information for controlling the telecommunication network node are carried out by a common hardware unit of the first hardware unit and the second hardware unit, the common hardware unit being a front end hardware unit; and
controlling, by a management hardware unit of the telecommunication network node wherein the management hardware unit is connected with the second hardware unit, the telecommunication network node according to the information received by the second hardware unit; and
maintaining session information for supporting the interaction between the front end hardware unit and an external management node,
wherein the form of at least one of the information sent by the first hardware unit and the information received by the second hardware unit includes at least one of audio data, still image data, video data, and email;
the second hardware unit is included in the telecommunication network node; and
the telecommunication network node is implemented as one or more blades of a blade system and the first hardware unit is implemented as one blade of the blade system.

6. The method of claim 5, further comprising at least one of:
converting the information relating to the status of the telecommunication network node into audio data at the first hardware unit prior to sending it;
converting the information relating to the status of the telecommunication network node into still image data at the first hardware unit prior to sending it; or
converting the information relating to the status of the telecommunication network node into video data at the first hardware unit prior to sending it.

7. The method according to claim 5, further comprising at least one of:
converting the received information at the second hardware node from an audio data form into commands understandable by the management hardware unit;
converting the received information at the second hardware node from a still image data form into commands understandable by the management hardware unit; or
converting the received information at the second hardware node from a video data form into commands understandable by the management hardware unit.

8. The method according to claim 5, wherein the first hardware unit comprises a camera configured for taking pictures of at least an outer surface of the telecommunication network node.

9. A computer program product configured to control a telecommunication network node, the computer program product comprising:
a non-transitory computer readable storage medium having computer readable program code embodied in the non-transitory computer readable storage medium that when executed by a processor causes the processor to perform operations comprising:
sending, by a first hardware unit, information relating to the status of the telecommunication network node;
receiving, by a second hardware unit, information for controlling the telecommunication network node, wherein the sending of the information relating to the status of the telecommunication network node and the receiving of the information for controlling the telecommunication network node are carried out by a common hardware unit of the first hardware unit and the second hardware unit, the common hardware unit being a front end hardware unit; and
controlling, by a management hardware unit of the telecommunication network node wherein the management hardware unit is connected with the second hardware unit, the telecommunication network node according to the information received by the second hardware unit; and
maintaining session information for supporting the interaction between the front end hardware unit and an external management node,
wherein the form of at least one of the information sent by the first hardware unit and the information received by the second hardware unit includes at least one of audio data, still image data, video data, and email;
the second hardware unit is included in the telecommunication network node; and the telecommunication network node is implemented as one or more blades of a blade system and the first hardware unit is implemented as one blade of the blade system.

10. The computer program product of claim 9, wherein the computer readable program code when executed by a processor further causes the processor to perform operations comprising at least one of:
  converting the information relating to the status of the telecommunication network node into audio data at the first hardware unit prior to sending it;
  converting the information relating to the status of the telecommunication network node into still image data at the first hardware unit prior to sending it; or
  converting the information relating to the status of the telecommunication network node into video data at the first hardware unit prior to sending it.

11. The computer program product of claim 9, wherein the computer readable program code when executed by a processor further causes the processor to perform operations comprising at least one of:
  converting the received information at the second hardware node from an audio data form into commands understandable by the management hardware unit;
  converting the received information at the second hardware node from a still image data form into commands understandable by the management hardware unit; or
  converting the received information at the second hardware node from a video data form into commands understandable by the management hardware unit.

12. The computer program product of claim 9, wherein the first hardware unit comprises a camera configured for taking pictures of at least an outer surface of the telecommunication network node.

* * * * *

UNITED STATES PATENT AND TRADEMARK OFFICE
CERTIFICATE OF CORRECTION

| | | |
|---|---|---|
| PATENT NO. | : 9,137,693 B2 | Page 1 of 1 |
| APPLICATION NO. | : 13/993777 | |
| DATED | : September 15, 2015 | |
| INVENTOR(S) | : Mariniello et al. | |

It is certified that error appears in the above-identified patent and that said Letters Patent is hereby corrected as shown below:

Specification

In Column 8, Line 53, delete "end unit 14" and insert -- end unit 15 --, therefor.

In Column 9, Line 16, delete "(ITS)" and insert -- (TTS) --, therefor.

Signed and Sealed this
Fifteenth Day of March, 2016

Michelle K. Lee
*Director of the United States Patent and Trademark Office*